United States Patent Office 3,403,256
Patented Sept. 24, 1968

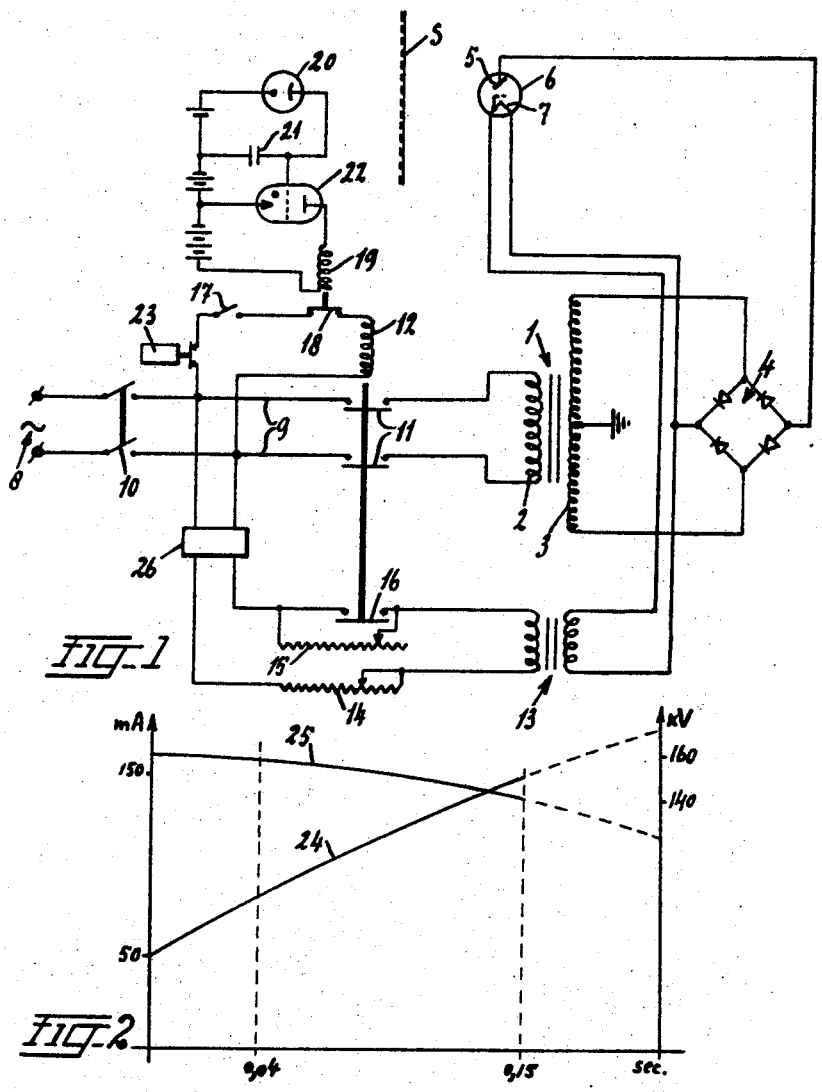

3,403,256
METHOD AND APPARATUS FOR MAKING AN X-RAY EXPOSURE ON A PHOTOGRAPHIC FILM WITH X-RAY TUBE CONTROL
Gerrit David Atse Hoekstra, Voorstraat 94a, Delft, Netherlands
Filed Dec. 7, 1965, Ser. No. 512,068
Claims priority, application Netherlands, Dec. 16, 1964, 6414680
12 Claims. (Cl. 250—95)

ABSTRACT OF THE DISCLOSURE

Method and apparatus for X-raying patients of arbitrary thicknesses by changing the filament current of the X-ray tube to vary X-ray intensity and by sensing the emission of an associated fluorescent screen.

---

The invention generally relates to a method and an apparatus for making X-ray photographs, in particular for purposes of medical examination.

When making medical X-ray photographs or radiographs in the conventional way, the subject to be exposed is placed in front of a fluorescent screen and the image appearing on this screen is photographed by means of a camera arranged to the rear of the screen. In order to obtain an exposure of high quality, it is essential that the exposed photographic film has the required density and that the image is sharply defined and has the right degree of contrast. This quality of the image is greatly influenced by the quality, i.e. the hardness of the X-rays and the quantity thereof. The quality of the X-rays depends on the voltage applied to the anode of the tube (kv.) and the quantity is determined by the product of the intensity of the current flowing through the tube and the time of exposure (ma. sec.).

In the conventional method for making X-ray photographs, for each subject to be X-rayed a distinct tube voltage is chosen, in most cases as low a voltage as is practical and with which it is expected that a good picture can still be obtained. This is generally done by measuring or weighing the patient to be radiographed and determining the desired tube voltage by means of a table. In connection with the value for the tube voltage so found (usually varying between ca. 50 kv. and 125 kv.), the tube current is then so chosen that in the shortest possible exposure time the required film density is obtained.

In the conventional X-ray installations the tube- voltage is, therefore, adjustable but has to be kept at a constant value during the exposure. This implies that an auxiliary voltage stabilizing apparatus is required to compensate possible fluctuations of the voltage of the network feeding the installation. X-ray installations of the transportable kind which must, therefore, be connectable to different networks, also need an apparatus for adapting the installations to the resistance of the network. Apart from the means for adjusting the tube voltage, a further complicated circuit for protecting the X-ray tube against overloading is required. All these auxiliary devices and circuits make the installation cumbersome, complicated and expensive.

In my U.S. Patent No. 2,936,376, granted May 10, 1960, I have disclosed a method and apparatus for X-ray exposures of a photographic film which to a great extent obviate the above discussed disadvantages of the conventional X-ray installations. In the operation of the X-ray apparatus there described, during the exposure of the film to the X-rays the anode voltage of the tube continuously increases from a selected minimum value and the current flow through the tube simultaneously and continuously decreases from a selected maximum value, until the tube is automatically disconnected when the desired exposure of the film for the subject to be X-rayed is attained. In this way, the correct (mean) tube voltage for each subject thickness is, so to say, automatically obtained in accordance with the requirements of the conventional radiographical exposure techniques, whereby prior weighing or measuring of the patient to be X-rayed and the selecting and adjusting of the tube voltage, tube current and exposure time may be dispensed with.

In this known apparatus the anode voltage applied to the X-ray tube rises from say 50 kv. to a value of maximum 15 kv., depending on the thickness of the subject being X-rayed. The mean value of the tube voltage is thus of the same order as the tube voltages used in the conventional exposure technique, i.e. the tube is operated in the so-called soft-ray range so as to emit rays of relatively low intensity. In making an X-ray photograph, the apparatus of the abovementioned patent depends essentially on an automatic regulation of the quality of the rays within the said range (regulation of the kv.-value of the tube voltage) in dependence on the thickness of the subject, with an additional automatic regulation of the quantity of the rays (regulation of the ma. sec.-value), to ensure that the required film density is attained.

In contrast to the above discussed exposure technique using X-rays of relatively low intensity in making X-ray photographs for medical examination purposes, it has been suggested to use X-rays of relatively high intensity, i.e. to operate the X-ray tube in the so-called hard-ray range by applying tube voltages in the range of, say, from 130 kv. to 170 kv. This has in itself the advantage that it is possible to use shorter exposure times and smaller X-ray doses and that the required power of the X-ray apparatus is reduced. In this connection it is pointed out that according to a well-known empiric formula the relation between the two variables to be adjusted when making X-ray photographs of a given subject, i.e. the tube voltage (kv.) on the one hand and the product of tube current and time (ma. sec.) on the other hand, can be expressed by:

$$\text{kv.}^p \times \text{ma. sec.} = \text{constant}$$

in which the exponent $p$ has a value of 4.5 to 5.0. It follows from this relation that by selecting a higher tube voltage the required power of the tube as expressed by the product of tube voltage, tube current and exposure time decreases.

Although it is therefore advantageous to operate the tube in the above mentioned hard-ray range, it has proved to be difficult to obtain photographs of sufficient contrast and quality when operating in this range and so far no one has succeeded in developing an apparatus of this type with which good results can be obtained rapidly and in a simple manner.

The invention has as an object the provision of a solution for this problem and to make it possible to obtain medical X-ray photographs of sufficient contrast and density by means of an X-ray apparatus operating in the said hard-ray range. More particularly it is an object of the invention to provide an X-ray apparatus of this kind which has, at a given high tube voltage, the shortest possible exposure time for all thickness values in the thickness range of the subjects involved.

Another object of the invention is to provide an X-ray apparatus for medical examination purposes of the abovementioned kind which does not require any prior weighing or measuring of the patient and corresponding adjustments of the tube voltage, tube current and exposure time before the X-ray photograph is made.

The invention is based on the recognition that—in contrast to the conventional technique—when operating the X-ray tube in the said hard-ray range the adjustment of the X-ray apparatus to the subject to be photographed involves essentially a regulation of the quantity (ma. sec.) rather than the quality (kv.) of the X-ray dose since the rays in this range have sufficient quality as such and a variation of the kv.-value within the range has relatively little influence on the resulting photograph. This quantity regulation in dependence on the thickness of the subject to be X-rayed appears, however, to be very critical.

It is further to be considered that photo-electric exposure time-switch means for automatically disconnecting the X-ray tube at the end of an exposure as described herebelow, do not function accurately below a certain time limit of about 0.04 sec. Considering a given range in which the thickness of a patient can vary, this means that at a given tube voltage a patient of the smallest thickness in this range should preferably be X-rayed with such a ma.-value of the tube current that a good photograph is obtained with an exposure time of about 0.04 sec., i.e. the shortest possible exposure time. However, if one should X-ray a heavy patient of a thickness at the opposite limit of the said thickness range by using a tube current of this same ma.-value, the exposure time would become too long. This means that for this heavy patient a higher ma.-value is required.

In making an X-ray photograph according to the present invention, the anode voltage applied to the X-ray tube is selected for operation of the tube in the said hard-ray range and during exposure of the film to the X-rays the current flow through the tube is continuously increased from a selected minimum value until the tube is disconnected when the desired exposure of the film, for the subject being X-rayed, is attained.

The apparatus for making X-ray photographs according to the invention thus generally comprises a high-voltage source to provide a tube voltage of a value selected so as to operate the X-ray tube in the said hard-ray range and further comprises circuit elements which immediately after the switching on of the high-voltage course at the start of an exposure cause the current through the tube to rise continuously from a preselected minimum value until the high-voltage source is disconnected by proper time-switch means. In this way the quantity regulation necessary for the hard-ray technique, as above discussed can be automatically obtained, meaning that the continuously increasing tube current makes it possible to obtain the desired mean ma.-value for making a photograph of a given subject in an exposure time varying between predetermined time limits of, for instance, 0.04 and 0.08 sec. As an example may serve an X-ray apparatus, of which the tube voltage has a preferred value of approximately 160 kv. and the tube current a value of 50 ma. at the moment the tube is switched on which tube current in 0.15 sec. would rise to approximately 150 ma., if the tube is not disconnected before that time, as will be generally the case. Thin persons are thus X-rayed at a lower mean tube current than heavy persons.

As has been mentioned above, variations of the anode voltage of the X-ray tube are of relatively little consequence when operating in the hard-ray range so that the adjustment of this voltage is not very critical and a tube voltage stabilizing and regulating device can be dispensed with. Obviously, also a regulating device for the tube current is not required.

As is the case with the X-ray apparatus according to the abovementioned U.S. Patent 2,936,376, the apparatus of the present invention preferably utilizes a photo-timer switch arrangement for controlling the exposure time. Such a photo-timer switch arrangement, in itself well known in the art, comprises a photo-electric device which cumulatively measures the quantity of light radiated by all or a portion of the fluorescent screen of the apparatus during exposure and, when this quantity reaches a selected value, excites a relay switch so as to disconnect the high-voltage source. By properly adjusting the elements of the photo-timer switch in correlation with the type of film used, it is thus possible to have the exposure finished at exactly the moment the right film density is reached.

In this way a practically automatically functioning X-ray apparatus is obtained. It is thus not necessary to have the patient weighed or measured in order to determine the correct values of the tube voltage, tube current and exposure time and to adjust the installation accordingly, but without any adjusting operation the patient can immediately be placed in front of the screen and the exposure switch be operated whereupon the photo-timer switch disconnects the X-ray apparatus after the correct exposure time.

According to a preferred embodiment of the invention, in which the high-voltage source comprises a high-voltage transformer, the impedance of the high-voltage transformer is so selected that during the rising of the tube current, the tube voltage decreases only to such an extent as is necessary to prevent overloading of the tube in the operating range. As has already been mentioned in the foregoing, when operating the tube in the hard-ray range, a small decrease of the tube voltage from e.g. 160 kv. to 140 kv. has practically no adverse influence on the resulting photograph, but such a decrease of the tube voltage may be of great importance for preventing overloading of the X-ray tube at the quickly rising tube current. In contrast to the known apparatus as disclosed by the abovementioned U.S. patent, the high-voltage transformer of the present X-ray apparatus thus preferably has a relatively small impedance of a value allowing to maintain during the exposure a tube voltage as high as possible without surpassing the permissible load of the tube. It is, however, desirable to provide the usual safety time limit relay which disconnects the tube after a time of, for instance, 0.15 sec. in case the photo-electric time-switch means fails.

According to a further preferred embodiment of the invention the rising of the tube current can be easily realized by increasing the voltage across the heater of the X-ray tube in one step from a high to a low level at the moment the high voltage source is connected across the X-ray tube.

These and other novel features of the invention will appear more fully from the following description and claims in conjunction with the drawing which shows an embodiment of the invention.

In the drawing:

FIGURE 1 is a simplified schematic diagram of connections of an X-ray apparatus provided in accordance with the invention; and FIGURE 2 illustrates the tube voltage curve and tube current curve as plotted against exposure time.

The X-ray installation diagrammatically shown in FIGURE 1 has a high voltage transformer 1 with a primary winding 2 and a secondary winding 3 provided with a grounded center tap. The transformer winding 3 feeds a biphase full-wave rectifier arrangement 4, the D.C. terminals of which are connected to the anode 5 and cathode 7, respectively, of an X-ray tube 6.

The primary transformer winding 2 is fed from a network 8 through leads 9 comprising a main switch 10 and a pair of contacts 11 of a relay switch having an actuation coil 12.

The heater of cathode 7 of the tube 6 is fed by a heating current transformer 13 which on its primary side is connected to the leads 9 through a variable resistance 14 for the adjustment of the heating current on the one hand and through a second variable resistance 15 on the other hand. The latter resistance 15 can be bridged by a contact 16 of the relay switch 11, 12. The feeding circuit for the heating current transformer 13 further comprises a stabilizer means 26 of well-known type for stabilizing the heating voltage of the tube 6. Coil 12 of relay switch 11 is connected to the leads 9 through a series connection of a break contact 18 of a relay switch having an actuation coil 19, a manually operated exposure switch 17 and a suitable safety time limit relay means 23 of known type.

The relay switch 18, 19 is controlled by a photo-timer switch arrangement of well-known type comprising a photo-electric cell 20, a condenser 21 connected across this cell to be charged by the latter and a thyratron 22 controlled by the voltage of the condenser 21 which is connected across the grid and cathode thereof. The output circuit of the thyratron 22 comprises the coil 19 of relay switch 18, 19. The photo-electric cell 20 is so arranged as to receive light radiated by a portion of the picture appearing on the fluorescent screen S of the apparatus during the exposure of an object placed in front of this screen which picture is at the same time photographed by a camera arranged together with the cell to the rear of this screen. The construction and relative arrangement of the elements of the radiographic outfit comprising an X-ray tube, fluorescent screen, camera and photo-timer arrangement are well known in the art and are, therefore, not shown and described in detail.

The working of the installation represented in FIG. 1 is as follows.

When the main switch 10 is closed, the X-ray tube 6 receives a reduced heating current through transformer 13, the value of this current being determined by the setting of the variable resistances 14 and 15. The contacts of the relay switches 11, 12 and 18, 19, respectively, remain in their positions as represented in FIG. 1 of the drawing.

The transformer 1 is so dimensioned that on its connection to the network 8, the voltage across the X-ray tube 6 is approximately 160 kv., i.e. the tube is operated in the so-called hard-ray range as above discussed. The transformer 1 has a relatively low impedance so that an increase of the current flowing through the tube 6 and the transformer winding 3 causes only a relatively small decrease of the transformer output voltage and thus of the voltage across the tube 6.

When an exposure has to be made, the exposure switch 17 is moved by hand to its closed position, whereby the circuit through the break contact 10 of relay switch 18, 19 and the coil 12 of relay switch 11, 12 is closed. This latter relay switch immediately closes its contacts 11 and 16, whereby the transformer 1 is connected to the network 8 and the X-ray tube 6 is put under voltage. At this moment, the tube current which is initially determined by the heating current as restricted by the resistances 14 and 15 is, for instance, 50 ma. and the tube voltage has the above mentioned value of 160 kv. By the simultaneous closing of the contact 16 of the relay switch 11, 12, however, the resistance 15 in the heater feeding circuit is bridged, whereby the voltage across the transformer 13 is increased in one step to its full value, as adjusted by the variable resistance 14 only, and whereby the tube current within 0.15 sec. rises from 50 ma. to about 150 ma. as indicated by the curve 24 of the diagram of FIGURE 2. Because of the impedance of the transformer, though relatively low, the tube voltage simultaneously drops from 160 kv. to about 140 kv. according to the curve 25 of this diagram. If the photo-timer switch arrangement 19-22 fails to respond, the tube is disconnected after 0.15 sec. by the time limit relay 23 to prevent overloading of the tube, said relay opening the circuit of the coil 12 of the relay switch 11, 12, which immediately opens its contacts 11 and 16.

In normal circumstances, however, the X-ray tube will have been previously disconnected by the photo-timer switch 19-22. Part of the light radiated by the fluorescent screen S during exposure is received by the photo-electric cell 20, and the condenser 21 is thus charged by the resulting current flowing through the cell circuit, the speed of charging being dependent on the quantity of light received by the cell 20. As soon as the voltage across the condenser 21 has reached a selected value, the thyratron 22 fires, whereby relay coil 19 is excited, opening its relay contact 18. The circuit of relay switch coil 12 is thus interrupted and the high-voltage transformer 1 disconnected. By properly selecting and adjusting the elements of the photo-timer switch circuits with respect to the properties of the film used for photographing the image appearing on the fluorescent screen S, this disconnection can be made to occur exactly at the moment the right film density has been obtained.

By known holding circuit means, not shown in the drawing, it is possible to obtain that after the disconnection of the transformer 1 by the opening of the relay contacts 11 these contacts and also the relay contact 16 remain open after the de-excitation of the relay coil 19 and the return of the relay contact 10 to its initial closing position, so that the transformer 1 remains disconnected and the resistance 15 in the heating circuit is not bridged by the relay contact 16 until the next operation of the exposure switch 17. To this effect similar holding circuit means can be used as disclosed in the abovementioned U.S. patent.

The photo-timer switch arrangement 19-22 only functions accurately for exposure times longer than approximately 0.04 sec. By proper adjustment of the resistances 14 and 15 it is possible to so choose the form of the tube current-time curve 24 of FIG. 2 that for children and thin persons the exposure time has the minimum value of 0.04 sec. and that the exposure time for very heavy persons is approximately 0.08 sec. The latter exposure time thus is still considerably shorter than the time limit of 0.15 sec., at which the X-ray tube is disconnected by the time-switch means 23.

The described apparatus of FIG. 1 needs no stabilizing device for the tube voltage. The stabilizer means 26 for the voltage of the heating current circuit, although shown, may in many cases be dispensed with and at any rate can be relatively simple.

It will be obvious to those skilled in the art that various modifications of the embodiment of the invention as shown and described can be resorted to within the scope of the following claims.

I claim:

1. A method of controlling an X-ray tube for making an X-ray exposure on a photographic film comprising applying an anode voltage in excess of about 125 kv. for operation of the tube and, during exposure of said film to the X-rays thusly generated, continuously increasing current flow through the tube from a selected minimum value and inactivating the tube when a predetermined exposure of the film for the subject being X-rayed is attained.

2. The method as claimed in claim 1 comprising measuring the exposure caused by the X-rays as affected by the subject being X-rayed and deactivating the tube when a predetermined exposure has been obtained.

3. An X-raying method for making an exposure on a photographic film comprising applying an anode voltage in excess of about 125 kv. to an X-ray tube for the generation of X-rays in the high-intensity range to obtain an exposure on said film of the subject to be X-rayed, applying to the cathode of the tube during exposure of the film a heater voltage, increasing the heater voltage during the film exposure to increase the cathode temperature whereby current flow through the tube increases in a continuous manner, and deactivating the X-ray tube at the end of the exposure.

4. The method as claimed in claim 3 in which the anode voltage applied to the X-ray tube is in the range of 130–170 kv.

5. Apparatus for making an X-ray exposure on a photographic film, said apparatus comprising an X-ray tube, voltage applying means for applying an operating voltage of at least 125 kv. across said X-ray tube, a voltage source, switch means for connecting said voltage applying means to said voltage source, means coupled to said tube for continuously increasing the current passing therethrough during the exposure of said film, and means controlling said switch means for opening the latter at the end of an exposure.

6. Apparatus as claimed in claim 5, in which said voltage applying means includes means to apply a voltage to said tube at the start of an exposure of approximately 160 kv.

7. Apparatus as claimed in claim 5 in which said means controlling said switch means includes means responsive to the X-ray dosage penetrating the object to be photographed to automatically open said switch means when a predetermined exposure of the subject being X-rayed is obtained.

8. X-ray apparatus for the exposure of a photographic film comprising an X-ray tube including an anode and a cathode, cathode feeding means for feeding a heating current to said cathode, a voltage source coupled to the anode, and a control means for said cathode feeding means for raising the heating current of the cathode during film exposure and thus continuously increasing current flowing through the tube, said voltage source being adapted to apply and maintain an anode voltage in the range of at least 125 kv. when said tube current increases.

9. Apparatus as claimed in claim 8 in which said cathode feeding means comprises a heating circuit, a resistor in said heating circuit and a short-circuiting means to by-pass said resistor, said control means comprising a switching device coupled to said short-circuiting means to control the by-passing of said resistor.

10. Apparatus as claimed in claim 9 in which said tube voltage source has a low impedance.

11. X-ray apparatus comprising an X-ray tube including an anode and a thermally responsive electron emission electrode, a voltage source, a resistor coupling said source to said emission electrode, a low impedance device for coupling said source to said anode and applying to said anode a voltage in the range of at least 125 kv., means for by-passing said resistor at least in part, a switch for coupling the source to the anode via said low impedance device and actuating said means whereby the current through said tube is continuously increased during exposure of a photograph film, means for registering the exposure of a subject, means for evaluating the rays as registered by said exposure registering means and being coupled to said source for disconnecting the tube from said source when an exposure of predetermined magnitude has been obtained.

12. Apparatus as claimed in claim 11 in which the second said means is a fluorescent screen and the third said means comprises a photo-sensitive device.

References Cited

UNITED STATES PATENTS

| | | | |
|---|---|---|---|
| 2,825,816 | 3/1958 | Rogers | 250—95 |
| 2,913,582 | 11/1959 | Collins et al. | 250—103 |
| 2,936,376 | 5/1960 | Hoekstra | 250—103 |
| 3,027,460 | 3/1962 | Boldingh | 250—103 |

WILLIAM F. LINDQUIST, *Primary Examiner.*